United States Patent
Yli-Vakkuri et al.

Patent Number: 5,437,704
Date of Patent: Aug. 1, 1995

[54] METHOD AND FURNACE FOR BENDING GLASS SHEETS

[75] Inventors: Erkki Yli-Vakkuri; Arto Kaonpää; Tapio Salonen; Jukka Nikkanen, all of Tampere, Finland

[73] Assignee: Tamglass Engineering Oy, Tampere, Finland

[21] Appl. No.: 132,184

[22] Filed: Oct. 6, 1993

[30] Foreign Application Priority Data

Oct. 15, 1992 [FI] Finland .................................. 924666
Jun. 21, 1993 [FI] Finland .................................. 932861
Jul. 23, 1993 [FI] Finland .................................. 933318

[51] Int. Cl.$^6$ ........................................ C03B 23/025
[52] U.S. Cl. ........................................ 65/107; 65/273; 65/268; 65/285
[58] Field of Search ................ 65/107, 104, 268, 273, 65/285

[56] References Cited

U.S. PATENT DOCUMENTS

| | | |
|---|---|---|
| 2,967,378 | 1/1961 | Jones et al. . |
| 3,001,328 | 9/1961 | Berseth .............................. 65/268 |
| 4,497,645 | 2/1985 | Peltonen ............................ 65/107 |
| 4,755,204 | 7/1988 | Boardman et al. ................ 65/107 |
| 4,983,201 | 1/1991 | Peltonen ............................ 65/104 |
| 4,986,842 | 1/1991 | Peltonen ............................ 65/107 |
| 5,009,691 | 4/1991 | Aratani . |
| 5,173,102 | 12/1992 | Weber et al. ..................... 65/273 |
| 5,194,083 | 3/1993 | Lehto ................................. 65/107 |

FOREIGN PATENT DOCUMENTS

0370310 5/1990 European Pat. Off. .
0486952 5/1992 European Pat. Off. .

*Primary Examiner*—W. Gary Jones
*Assistant Examiner*—Steven P. Griffin
*Attorney, Agent, or Firm*—Burns, Doane, Swecker & Mathis

[57] ABSTRACT

The invention relates to a method and a furnace for bending glass sheets. Glass sheets supported on ring molds are heated to a bending temperature and are carried from one heating station to another. In a heating and bending station, the glass sheet is heated for effecting a desired bending partially or entirely through the action of gravity. During a bending operation, the temperature distribution of radiation heat is adjusted. In the heating stations, the glass sheet is subjected to the action of convection blasting.

26 Claims, 7 Drawing Sheets

METHOD AND FURNACE FOR BENDING GLASS SHEETS

BACKGROUND AND SUMMARY OF THE INVENTION

The present invention relates to a method for bending glass sheets, in which method a cold, non-bent glass sheet is placed on a mould, the mould and the glass sheet supported thereby are carried on a mould wagon through preheating and heating station, the glass sheet supported by the mould is heated in each preheating and heating station until the glass reaches a bending temperature, the heated glass sheet supported by the mould is carried to a bending station and the glass sheet is further heated in the bending station so as to effect a desired bending partially or entirely through the action of gravity.

The invention relates also to a bending furnace for glass sheets, comprising a number of successive preheating and heating stations, a bending station, a number of successive cooling stations below said preheating and heating stations, moulds for supporting glass sheets during the course of heating, bending and cooling, and wagons for carrying the moulds from one station to another.

The preferred embodiment of the present invention relates to a method for bending laminated glass sheets, wherein superposedly laminated, non-bent glass sheets are placed on a ring mould, the ring mould and the pair of laminated glass sheets supported thereby are carried on a mould wagon through preheating sections, the pair of glass sheets supported by the mould is transferred into a bending section, the pair of glass sheets is heated to a bending temperature and a bending operation is effected.

The above type of method and furnace apparatus for bending glass sheets are prior known from the commonly-assigned patent publications U.S. Pat. No. 4,497,645 and U.S. Pat. No. 4,986,842. This type of furnace is especially intended for bending laminated windshields gravitationally by means of a ring mould. Naturally, press bending can also be used to assist gravitational bending. When bending typical windshield profiles, heating resistances are used to make sure that the glass sheet has a heat distribution which contributes to the formation of a desired bending shape. For example, due to the steeper bending curves formed therein, the end sections are subjected to more radiation heat than the mid-section which remains relatively flat.

It is prior known from patent publications U.S. Pat. No. 5,009,691 and U.S. Pat. No. 4,441,907 to employ forced convection in a heating step preceding the bending. Neither of these publications says anything about forced convection at the time a glass sheet is already in the mould where it is heated and bent. It is prior known from patent publication U.S. Pat. No. 2,967,378 to employ the local application of radiation heat to a glass sheet to be bent in a mould. From patent publication U.S. Pat. No. 4,755,204 it is prior known to minimize the temperature difference between the mold and the glass by directing hot air around the mold beneath the glass.

The increase of production capacity is one of the basic objectives in further development of the bending lines in vehicle windshields and backlights.

In addition, there has developed a need to produce also such bending shapes, wherein the mid-section of a glass sheet bends to a progressive or uniformly extending curve without the mid-section remaining any flatter than the rest of a glass sheet. Such a shape is preferred e.g. for the reason that the windshield wipers operate more efficiently as their pressure on the glass surface remains more uniform. The aerodynamic reasons can also be a basis for preferring a progressive bending curve. This is not possible to achieve by means of resistance fields used for bending conventional windshield configurations. In principle, it would be possible to alter the resistance field configuration and the disposition of resistances in a manner that one and the same apparatus can be used for bending both conventional windshield shapes and shapes with the mid-section bent to a progressive curve. However, the re-arrangement of resistance fields for this purpose is an inconvenient and expensive operation. The shape control becomes more difficult as the pocket to which the entire glass sheet should be bent becomes deeper and the surface area of a glass sheet becomes larger.

In general, the sag bending takes a long time in order that also the bending shape is under control.

An object of the invention is to provide a method and a furnace assembly of the above type which, are also capable of substantially improving production capacity and effecting intensified bending of the mid-section of a glass sheet in view of producing various bending shapes without having to resort to the structural re-arrangement of resistance fields.

This object is achieved by means of a method of the invention in a manner that, during the course of heating effected in a preheating station and/or in the prebending station and/or in the bending station, the heating of a glass sheet is intensified by the application of convection blast, and during the course of bending the distribution of radiation heat is adjusted.

In a preferred embodiment the blasted air is colder than the surrounding air in the furnace. As a result of this, there is no excessive heating at the blasting point, but the convection effect is spread along the glass surface such that it may be evenly divided or even stronger at the areas surrounding the blasting point.

The convection blast can be focused to any section at which the bending to form a pocket should be intensified. In a typical case, the convection blast is focused on the mid-section of a glass sheet for bending it to a progressive curve.

Convection blast can be maintained throughout the period that the glass is stationary in a preheating station (or in a subsequent prebending or bending station), allowing for the use of a very weak blast which does not locally overheat the glass surface so as to form a "heat lens".

Though convection blast can also be used in a prebending station preceding the bending station and/or in the bending station itself, it is most advantageous to employ convection blast just in preheating stations for bending laminated glass sheets (windshields). The reason for this appears from the following.

The invention is particularly suitable for use in such a method, wherein the bending operation of laminated glass sheets is followed by transferring the mould wagon and the pair of bent glass sheets from an upper track onto a lower track and by cooling the pair of bent glass sheets on the lower track below said preheating sections.

This prior known method involves the following problem. Inside preheating sections develops a temperature difference of about 100° C. between the bottom and top glass. This temperature difference does not equalize even in the bending section. A result of this is that the bottom glass "resists" bending of the top glass and decelerates bending as it is necessary to wait for the bottom glass to heat up to a bending temperature. This effect is particularly pronounced in the process of creating a progressive sag in the middle of a glass piece or in complex bends in the corners.

In view of the above, it is a further object of the invention to overcome this problem and to equalize said temperature difference in a manner such that heating and bending can be accelerated and thus the production capacity of a furnace can be increased while facilitating the attainment of desired bending shapes.

This object is achieved by intensifying the transfer of heat by means of convection to the bottom glass of a pair of glass sheets lying in preheating section by blasting a small amount of air to the bottom surface of said bottom glass for thus reducing a temperature difference between the glass sheets included in a pair of glass sheets lying in preheating section.

In this particular type of furnace the transfer of heat to the bottom glass can be intensified by intensifying the transfer of heat from a glass piece cooling down on the lower track to the bottom glass piece lying on the upper track. In a particular application of the invention, this is effected by blowing a small amount of air through the open floor of a mould wagon from pipes fitted between the upper and lower tracks.

The best mode of the invention offers the following benefits:

the top and bottom glass pieces are brought to an equal temperature prior to the commencement of actual bending by making effective use of a temperature difference (about 100° C.) between the glass pieces lying on lower track and on upper track for heating the bottom glass piece on the upper track by applying convection without separate heating.

The homothermal glass facilitates rapid bending of the glass since there is no need in a bending process to wait for the bottom glass to heat up to a bending temperature.

The cooling process does not develop spreading or reverse bends in the glasses as a result of temperature differences between top and bottom glasses.

The glass finds its way better to a shape determined by a ring mould, especially in complex bends.

The bending of a progressive sag can be successfully effected with a short bending time.

A furnace or lehr assembly of the invention is characterized in that the preheating station and/or prebending station and/or bending station is provided with a convection-air blast pipe extended through the thermally insulated ceiling or wall and having its blasting orifice opening below and/or above a glass sheet placed in the preheating station and/or prebending station and/or bending station for blasting air colder than the surrounding furnace air towards the glass surface from said blasting orifice.

The convection-air blast pipe can be fitted with a pyrometer for measuring the glass temperature. Thus, the blasting action e.g. termination of the blasting, can be controlled on the basis of a temperature measurement effected by the pyrometer. In the first instance, the glass temperature measurement by the pyrometer is used for controlling and adjusting the distribution of radiation heat in the bending station, as disclosed in more detail in publication EP-0486952.

BRIEF DESCRIPTION OF THE DRAWINGS

One exemplary embodiment of the invention will now be described in more detail with reference made to the accompanying drawings, in which

FIG. 8 is a top plan view of the heating resistances in the heating and bending section, FIG. 8a showing an alternative to middle section resistances 12a;

DETAILED DESCRIPTION

Figure 1:
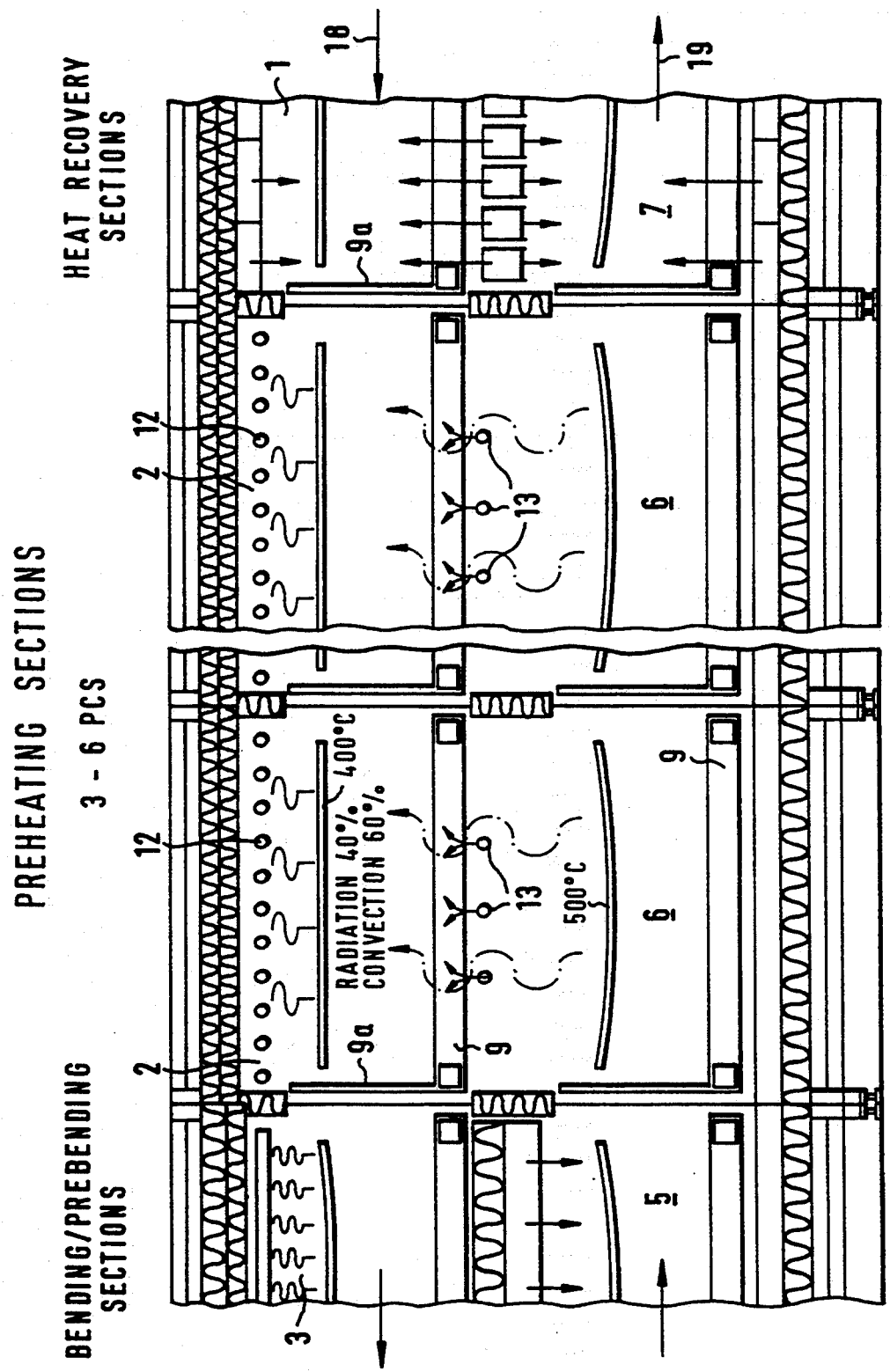
FIG. 1 shows a vertical section through the furnace assembly of the invention at preheating stations.
Figure 2:
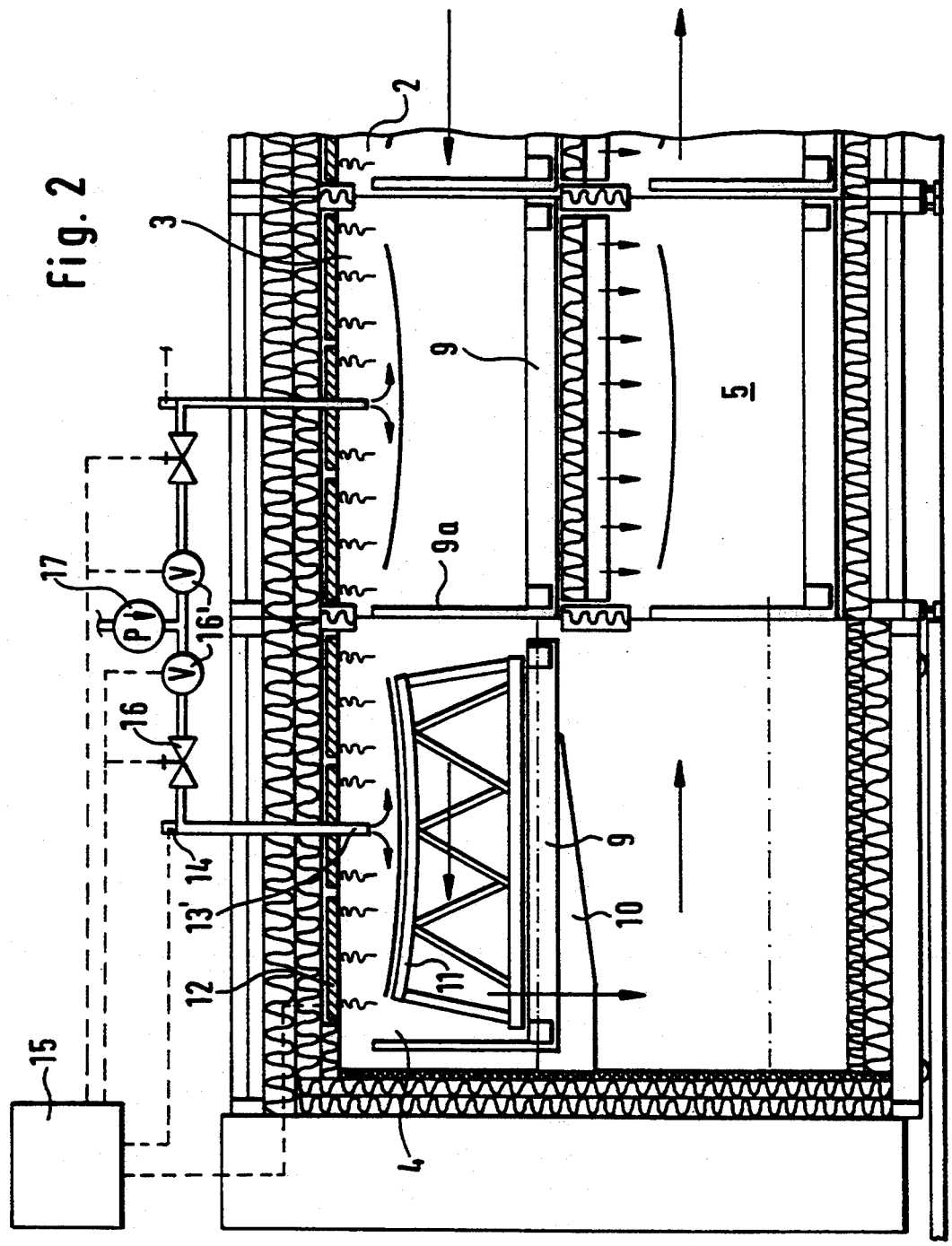
FIG. 2 shows a vertical section through the outlet end (bending station) of the same furnace assembly.
Figure 3:
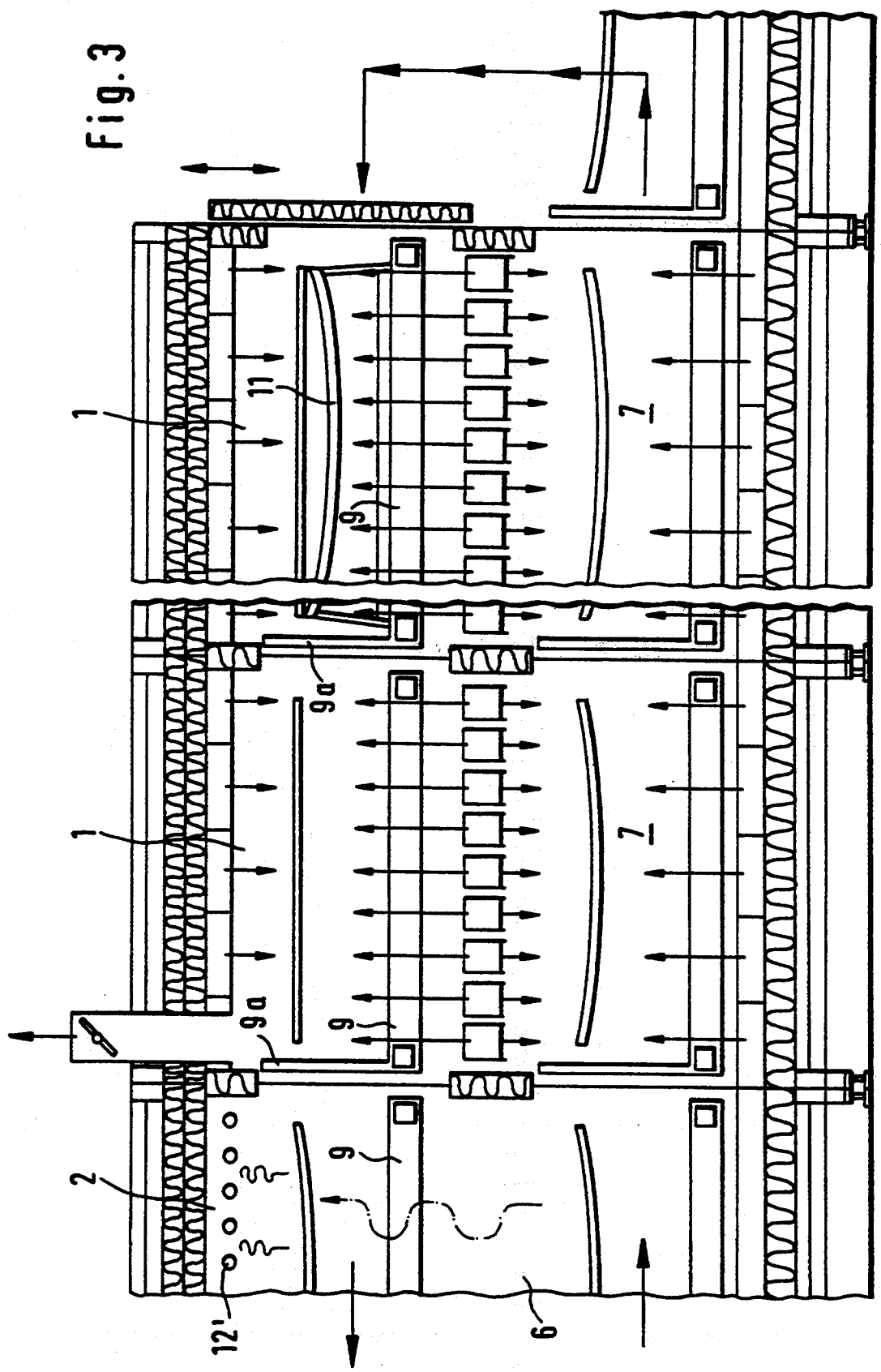
FIG. 3 shows a vertical section through the inlet end of the same furnace assembly.

A furnace for applying the method includes a number of successive heating stations or sections 1, 2, 3. A pair of superposed glass sheets to be laminated or a single glass sheet is carried by a ring mould 11 into the first furnace section 1. The term "a glass sheet" is used herein to refer to both a single glass sheet and a pair of superposed glass sheets to be laminated together. Mould 11, together with its glass sheet, is advanced from one section to another by means of a mould wagon 9 provided with an end wall 9a which separates the successive sections from each other. In first section 1, a glass sheet is primarily heated with forced convection receiving its thermal energy from a bent glass sheet in the process of cooling in lower cooling sections 7, as described in more detail in commonly-assigned patent U.S. Pat. No. 4,986,842. In sections 1, the share of forced convection from the heating effect of a glass sheet is typically 90% and the share of radiation is 10%. The number of heating sections 1 based on the recovery of heat can be 3-6 and a glass sheet reaches therein a temperature of 230° C.-300° C. prior to advancing into the following preheating section 2. In preheating sections 2, the heating is partially effected by means of heating resistances or radiators 12 and partially by convection heat, coming through the floor and/or around the edges of carrier wagons 9 and delivered by glass sheets in the process of cooling in lower cooling sections 6. In sections 2, the share of radiation is e.g. 40% and that of convection heating is 60%. The number of preheating sections is typically 3-6. From preheating sections 2 a glass sheet advances into a prebending section 3 as the glass temperature is e.g. about 530° C.-550° C. In prebending sections 3, the temperature is raised by a few dozen degrees, which already results in slight bending of a glass sheet. Finally, a glass sheet is advanced into an actual bending section 4, wherein its temperature is raised e.g. to a temperature range of 590° C.-635° C. At the bending temperature, glass is highly sensitive to temperature variations and, thus, a change of even a few degrees in the temperature of a glass sheet has a major effect on its susceptibility to bending. In bending section 4, the transfer of heat to glass is typically such that the share of radiation is 90% and that of convection is 10%.

Thus, the periodical progress of wagons 9 on an upper track 18 results in the formation of successive sections 1, 2, 3 and 4. After a bending operation, said wagon 9 and a pair of bent glass sheets are transferred from upper track 18 onto a lower track 19 by a lift 10 for conveying said wagons 9 in the opposite direction also periodically, whereby the currently cooling pairs of glass sheets are located below a pair of glass sheets being heated on upper track 18 at a given time.

It has been realized in the invention that, in addition to a temperature distribution achieved by means of ON/OFF switching of the resistances or radiators 12 in the bending section 4, convection blasting can be used to provide a more diversified range of shapes that can be bent in a controlled manner. Particularly, there has been a need for bending glasses having a rather large surface area in view of bending the mid-section thereof to a progressive curve. For this purpose, one embodiment of the invention includes a convection-air blasting pipe 13', which has been extended through the thermally insulated ceiling of the bending station 4 (and/or prebending station 3) and between heating resistances or radiators 12 to the proximity of the top surface of a glass sheet placed in the bending station. The distance between the bottom end of pipe 13' and the surface of a glass sheet can be within the range of 10 to 20 cm. The diameter of pipe 13' can be e.g. from 8 to 12 mm. In a typical case, pipe 13' is used to blow convection air very gently throughout the entire bending operation essentially over the mid-section of a glass sheet. The blowing rate is less than 0.1 l/s and typically within the range of 0.1 to 0.03 l/s. In order to accelerate the bending, a very gentle blowing (e.g. 0.01 l/s) can be used also for conventional bending shapes by making the necessary modifications to the program for controlling the temperature distribution of a resistance or heating field.

A pyrometer 14 is mounted on pipe 13' for measuring the temperature of bending glass. According to a predetermined program, a control unit 15 is provided to switch the resistances 12 off during the course of bending such that the radiation heat distribution pattern changes in a predetermined manner during the bending. The control unit 15 can also be used for controlling valves 16 and 16' on the basis of temperature measurement. Valve 16 is a control valve for the regulation of flow rate and valve 16' is an on/off- valve. Naturally, both valve types can be used separately or together for controlling the blowing time or rate. In a normal case, the blow control is not required at all for the duration of bending a single glass sheet but only when the type of glass sheet is changed.

The on/off switching of a blast is required at the time a glass sheet is transferred from one station into another, so that the blasting or blowing would not be applied to the edge areas during a transfer. This is necessary since the focusing of a blast in any of the stations 2, 3 and/or 4 is used to make sure that a desired bending shape is attained.

Thus, a typical case involves the use of a continuous and constant blow during the stay of glass at each station and the distribution of heat transfer is adjusted by adjusting the temperature distribution of a resistance field 12. The adjustment concerns primarily as to when and how many of the mid-section resistances or radiators are switched off at the final stage of heating in the bending section 4.

A similar convection-air blasting system can also be arranged in preheating station 3. The creation of a necessary convection blasting requires a very low-power pump 17. Since the amount of air to be blown or blasted is very small, the blast air can be obtained directly from the room surrounding the furnace. Therefore, the air discharging from the pipe 13' is colder than the air in the furnace, this being the case also when the air in the pipe 13' is preheated (e.g. by the surrounding air in the furnace).

A convection blasting of the invention serves to achieve, in addition to improved control over a bending area, also an increase in capacity since the convection blasting makes the bending operation substantially quicker. This is not actually a result of the increase of heat transfer effected by convection but it is due to the following facts: (1) the temperature difference between top and bottom glasses (or surfaces of a glass sheet) can be equalized, (2) the adjustment of resistances or radiators is not the only means for controlling the heat transfer distribution, and (3) in many cases, the total amount of radiation heat can be increased if desired.

The location of a blasting spot as well as the blasting distance and the temperature of discharging air each have an effect on the shape a glass sheet is bending to.

As already pointed out, in preheating sections 2 (FIG. 1) there develops a temperature difference of about 100° C. between top and bottom glasses. This temperature difference causes the drawbacks mentioned in the introduction. In preheating section 2, the temperature of bottom glass can be e.g. 400° C. The temperature of a pair of glass sheets in the process of cooling on lower track 19 therebelow can be e.g. 500° C. Now, the transfer of heat possessed by the glass on lower track 19 can be intensified by means of convection to the bottom glass of upper track 18 by blowing or blasting a small amount of air through the open floor of wagon 9 from pipes 13 fitted between the upper and lower tracks. There may be one or a plurality of blast pipes 13. It is possible to use e.g. horizontal pipes 13, having a diameter of 20 mm and provided with 2.0 mm orifices 20 over the entire length at 50 mm intervals. The size of orifices 20 in the middle may also be different to those on the edges. The air to be delivered into pipes 13 can be compressed or blast air, which is preheated in a pipe system circulating inside a furnace or by means of a separate heater. Pipe 13 can also be branched.

Figure 4:
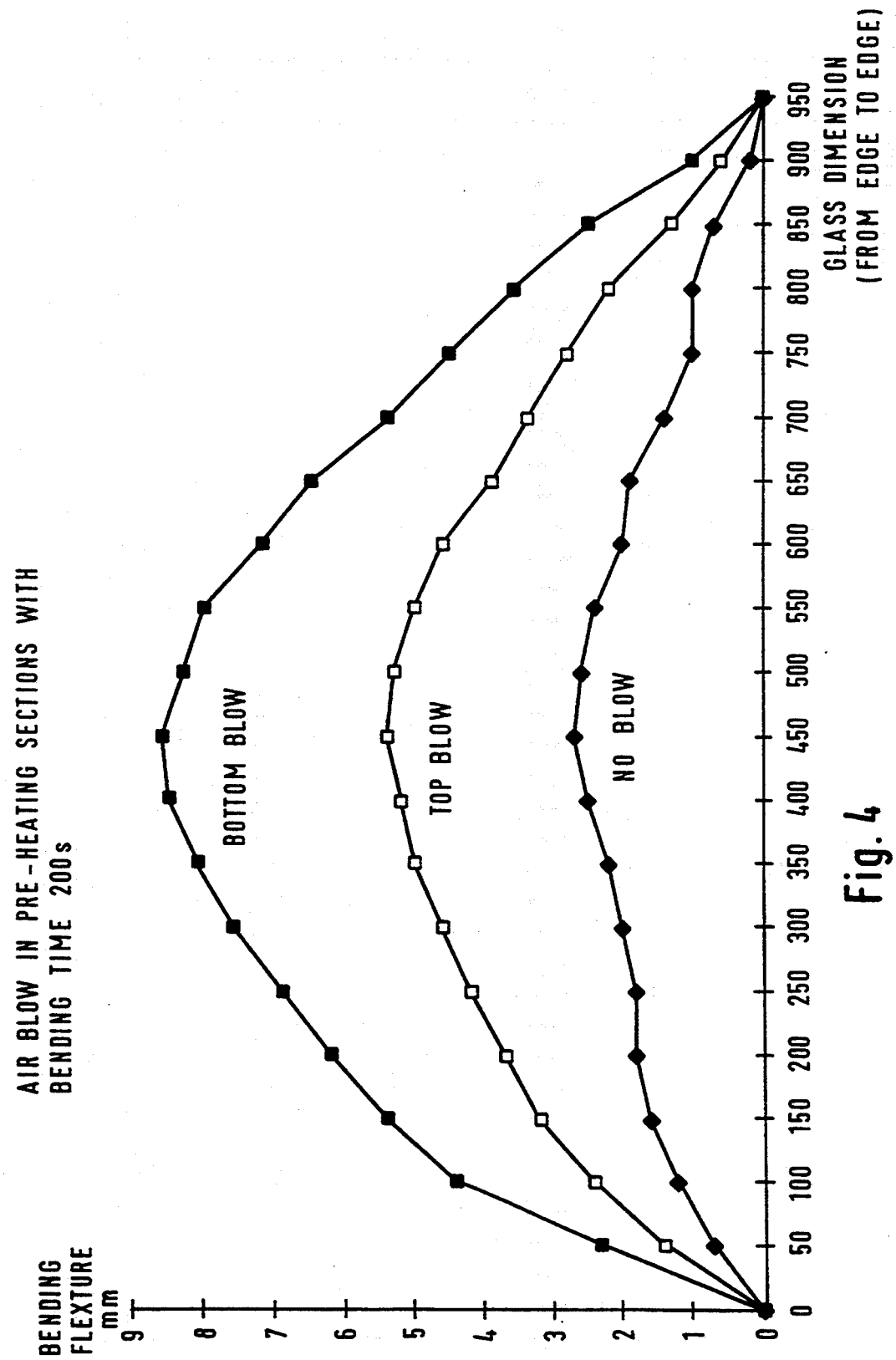
FIG. 4 shows test curves about the deflections of a glass sheet as a blast of the invention is applied to the bottom surface, top surface of a glass sheet and without a blast. In all cases, the constant bending time was 200 s.
Figure 5:
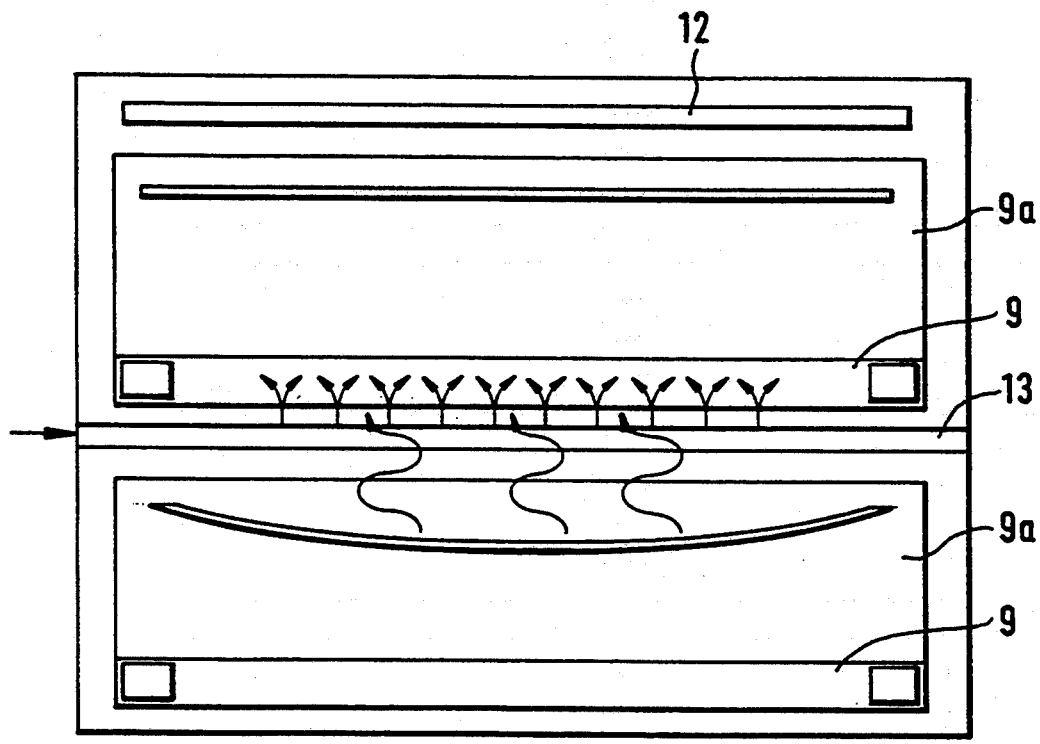
FIG. 5 is a schematic cross-section through a furnace at a preheating section 2.
Figure 6:
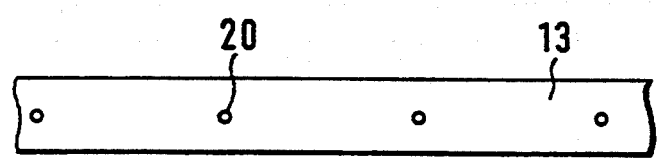
FIG. 6 shows a portion of a blast pipe 13 and its orifices in a plan view.

When using boosted convection according to the invention, the top and bottom glass can be brought to an equal temperature prior to commencing the actual bending. Equal temperature or homothermal glass facilitates rapid bending, since there is no need in the bending operation to wait for the bottom glass to heat up to a bending temperature. The glass finds its way better to a shape defined by a ring mould, especially in complex bends. Also the bending of a progressive sag is successfully effected with a short bending time. This is demonstrated by the test run curves shown in FIG. 4. The deflection illustrated by the top curve is produced by using convection intensified according to the invention for raising the temperature of bottom glass. However, if convection blasting is not applied, the deflection obtained by the same bending time of 200 seconds will be that demonstrated by the bottom curve. The middle curve shows that forced convection onto the top surface of the glass sheet also accelerates the bending, but substantially lesser than in the case of bottom blow.

In a typical case, said pipes 13 are used for blasting convection air throughout the heating period, as a glass sheet is stationary in section 2. When a glass sheet is transferred from one section to another, the blasting can be switched off, if necessary, in order not to apply the blast onto the edge portions. Although the amount of air to be blasted is relatively small, nor does it require separate heating, the method is capable of achieving an increase of about 30%-40% in production capacity as compared to a similar type of furnace without blasting.

Furthermore, the disposition of blast pipes 13 as well as the size and disposition of orifices 20 included in pipes 13 can be used for such an effect that the temperature distribution of a glass sheet will be beneficial in view of a desired bending shape.

In other words, the location of a blasting spot or the locations and distribution of the blasting spots have an effect on the shape a glass sheet is bending to. Along with or in addition to the mid-section, the blasting can be focused or distributed on the corner sections of a glass sheet, which require relatively sharp bends in multiple directions. If desired, the blowing spot of blast pipe 13 can be adapted to be maneuverable in vertical and/or horizontal direction. The manipulation of a blasting spot can be effected from outside the furnace mechanically by means of a suitable operating leverage. Naturally, it is possible to use both overhead and underhand blasts applied to the top and bottom surface of glass. In a typical case, however, blasting is used below the mid-section of a glass sheet in the preheating sections 2, and the shape is also provided by means of a program controlling the distribution of radiation heat.

In a preferred embodiment, in the heating and bending section 4 there are additional resistances or radiators 12w on the side walls of the furnace below the level of the edge of the glass to be heated. The resistances or radiators 12w increase the general temperature of the lower portion of the heating and bending section 4. These additional resistances or radiators particularly aid the bending of the corners of the glass sheet.

Figure 8A:
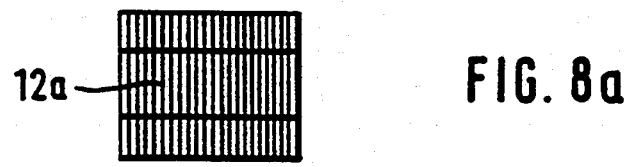
Figure 8:
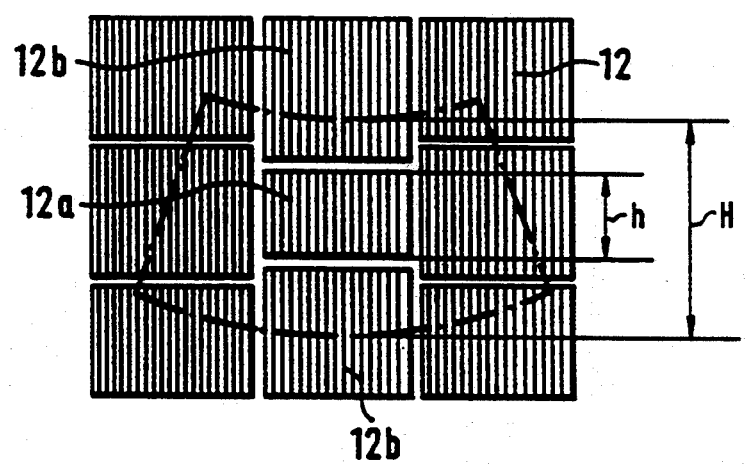
Figure 9:
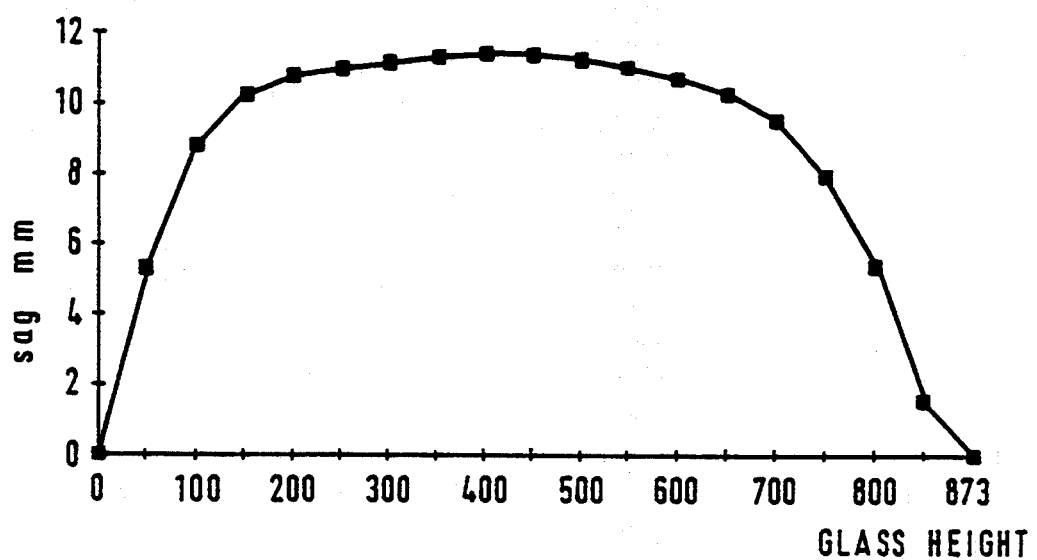
FIGS. 9 and 10 show sag profile curves with different relations between the glass height (H) and the length (h) of middle section resistances 12a in FIG. 8.
Figure 10:
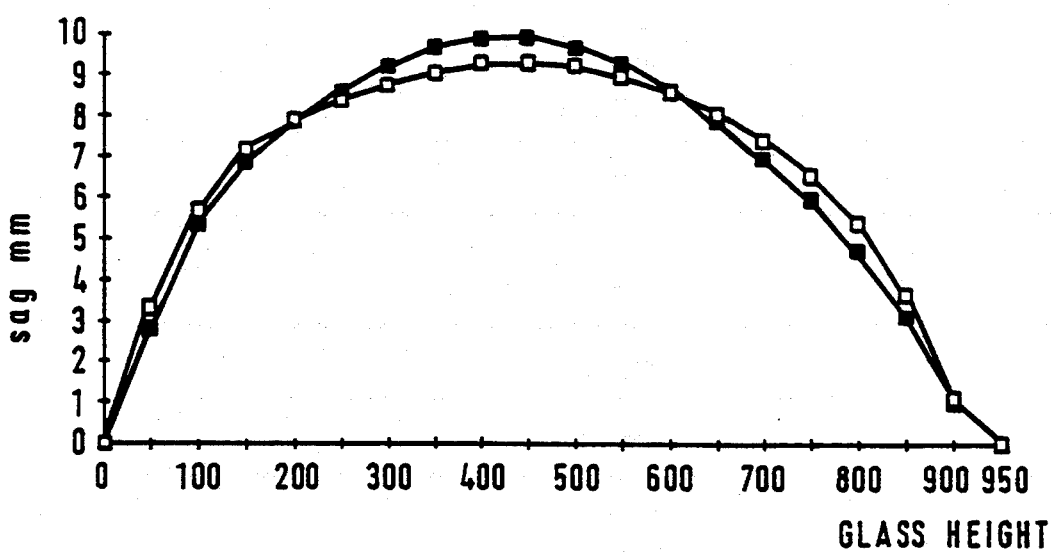

It has found to be particularly advantageous to use only relatively short top resistances or radiators 12a above the middle area of the glass sheet when the glass sheet is bending in the heating and bending section 4 (FIG. 8). FIG. 9 shows a sag profile in the height direction of the glass sheet with the relation between the glass height H and the length h of the heated resistances or radiators 12a being about 2. (The resistances or radiators 12b are switched off during the sag bending). The resistances or radiators 12a with said relation 2 are still too long, i.e. the heated area extends too close to the lower and upper edge of the glass sheet, with the result that the sag profile is not progressive. FIG. 10 shows two different sag profiles with said relation being 2.2 (open dots) and 2.6 (black dots). The sag profile with said relation 2.6 is almost completely progressive.

Figure 7:
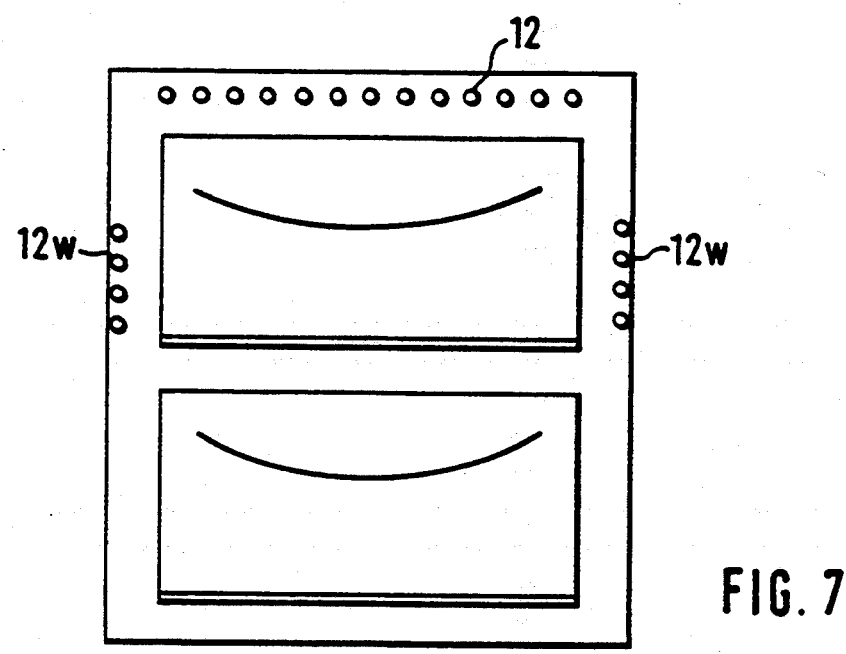
FIG. 7 is a schematic cross-section through the heating and bending section.

For this purpose the resistances or radiators 12a above the middle section can be divided in three sections, which can be separately switched on and off (FIG. 8a). Alternatively, the resistances or radiators above the middle section can be made substantially shorter than the resistances or radiators (12, 12b) surrounding said middle section (FIG. 8). The resistances or radiators 12, 12b surrounding the middle section must extend substantially beyond the glass contour. During the sag bending, only the middle section resistances or radiators 12a and the outermost resistances or radiators 12 at the corners as well as at the ends of the middle section, close or beyond the glass edges, are switched on. This provides progressive sag bending, and the complex bending at the corners of the glass sheet is ensured by the wall resistances or radiators 12w (FIG. 7).

Switching off of the resistances or radiators 12, 12b around the middle section resistances or radiators 12a takes place at the beginning and/or during the sag bending. This switching off of the resistances or radiators is controlled by the measured glass temperature.

While this invention has been illustrated and described in accordance with a preferred embodiment, it is recognized that variations and changes may be made therein without departing from the invention as set forth in the claims.

We claim:

1. A method for bending glass sheets comprising the steps of:
    transferring a glass sheet to one or more preheating sections of a furnace;
    preheating the glass sheet by radiation and forced convection in the preheating sections;
    directing the forced convection on an area of the glass sheet in the preheating sections by blowing air through a convection air blasting pipe at the area, thereby intensifying the forced convection, such that a temperature difference between an upper surface of the glass sheet and a lower surface of the glass sheet is reduced;
    transferring the preheated glass sheet to a bending section of the furnace;
    heating the glass sheet by radiation heat in the bending section so that the glass sheet is bent; and
    adjusting a heat distribution of the radiation heat in the bending section during bending.

2. A method as claimed in claim 1 wherein the forced convection is maintained substantially constant during preheating in each preheating section.

3. A method as claimed in claim 1 wherein the forced convection is directed on at least a central area of the glass sheet.

4. A method as claimed in claim 1 wherein the forced convection is directed on a lower surface of the glass sheet.

5. A method as claimed in claim 1 wherein bending takes place by gravity.

6. A method as claimed in claim 1 wherein air blown through the convection air blasting pipe is drawn from outside of the furnace and is colder than surrounding air in the preheating sections.

7. A method for bending a pair of glass sheets in a furnace comprising the following steps:
    placing a pair of glass sheets on a ring mold which is supported on a mold wagon;
    transferring the mold wagon, the ring mold, and the pair of glass sheets along a first horizontal track by increments substantially corresponding to a length of the wagon in the transferring direction;
    stopping the mold wagon for a stoppage period after each transfer increment;
    heating the pair of glass sheets by convection heat during stoppage periods after each of a first set of transfer increments;

preheating the pair of glass sheets by radiation from above and by convection from below during stoppage periods after each of a second set of transfer increments;

reducing a temperature difference between an upper and a lower one of the pair of glass sheets, while preheating the pair of glass sheets, by intensifying the convection from below with forced convection to increase a temperature of the lower glass sheet with respect to a temperature of the upper glass sheet;

subsequent to preheating the pair of glass sheets, further heating the pair of glass sheets by radiation during at least one stoppage period in a prebending section so that the pair of glass sheets are heated to a temperature for initial bending;

transferring the wagon, the ring mold, and the pair of glass sheets from the prebending section to a bending section;

heating the pair of glass sheets by radiation heat in the bending section so that the pair of glass sheets are bent;

adjusting a local temperature distribution of the radiation heat in the bending section during bending of the pair of glass sheets by turning on and off selected heating elements forming a heating element field in the bending section, the heating element field covering the pair of glass sheets;

lowering the wagon, the ring mold, and the pair of glass sheets to a second horizontal track located underneath the first horizontal track when the pair of glass sheets has reached its desired bending depth;

transferring the mold wagon, the ring mold, and the pair of glass sheets along the second horizontal track by increments equal to the transfer increments along the first horizontal track, transferring directions along the first and second horizontal tracks being opposite to each other; and allowing gradual cooling of the pair of glass sheets on the second track.

8. A method as claimed in claim 7 wherein heating energy for the preheating by convection from below is obtained from pairs of glass sheets cooling on the second track.

9. A method as claimed in claim 7 wherein the convection is intensified with forced convection in the form of forced jets of air which are directed through open portions of a bottom of the mold wagon on the first track.

10. A method as claimed in claim 7 wherein the forced convection is maintained substantially constant during preheating.

11. A method as claimed in claim 7 wherein the forced convection is directed to at least a central area of the glass sheet.

12. A method as claimed in claim 7 wherein bending takes place by gravity.

13. A method as claimed in claim 7 wherein air is blown through a convection air blasting pipe to create the forced convection, the air blown through the convection air blasting pipe being drawn from outside of the furnace and being colder than surrounding air in the preheating section.

14. A method for bending glass sheets in a furnace comprising the steps of:
transferring a glass sheet to at least one preheating section;

preheating the glass sheet in the preheating section with radiation from above and forced convection from below;

reducing a temperature difference between a top surface and a bottom surface of the glass sheet by intensifying the forced convection;

transferring the preheated glass sheet to a prebending section;

initially bending the glass sheet in the prebending section by raising a temperature of the glass sheet to a first temperature for initial bending;

transferring the prebent glass sheet to a bending station;

heating the glass sheet by radiation heat and forced convection in the bending station so that the glass sheet is bent, the bending station including a heating element field including a plurality of heating elements, the heating element field covering the glass sheet; and adjusting a heat distribution of the radiation heat in the bending section during bending by turning on and off selected ones of the heating elements.

15. A method as claimed in claim 14 wherein the forced convection is maintained substantially constant during bending.

16. A method as claimed in claim 14 wherein the forced convection is directed against at least a central area of the glass sheet.

17. A method as claimed in claim 14 wherein the forced convection is directed against both an upper and a lower surface of the glass sheet.

18. A method as claimed in claim 14 wherein bending takes place by gravity.

19. A method as claimed in claim 14 wherein air is blown through a convection air blasting pipe to create the forced convection, the air blown through the convection air blasting pipe being drawn from outside of the furnace and being colder than surrounding air in the bending station.

20. A method for bending glass sheets comprising the steps of:
transferring a glass sheet to one or more preheating sections of a furnace;

preheating the glass sheet by radiation and forced convection in the preheating sections;

directing the forced convection on an area of the glass sheet in the preheating sections by blowing air through a convection air blasting pipe at the area;

transferring the preheated glass sheet to a bending section of the furnace;

heating the glass sheet by radiation heat in the bending section so that the glass sheet is bent; and adjusting a heat distribution of the radiation heat in the bending section during bending, wherein, during bending, the glass sheet is subjected to radiation heat from side heating elements on side walls of the furnace below an edge of the glass sheet and also from upper heating elements on top of a middle section of the glass sheet, the length of the upper heating elements being limited in the height direction of the glass sheet, wherein a relation between the glass sheet height and the length of the upper heating elements is greater than 2.2.

21. A method as claimed in claim 20, wherein the relation between the glass sheet height and the length of the upper heating elements is greater than 2.4.

22. A bending furnace for glass sheets, comprising:

one or more heating stations including at least one preheating station, the preheating station including a heating element field including a plurality of upper heating elements on a top of the preheating station;

a bending station, the bending station including a heating element field including a plurality of upper heating elements on a top of the bending station, the heating element field covering a glass sheet disposed in the bending station;

one or more cooling stations below the heating stations;

means for carrying a glass sheet from one station to another;

a convection-air blasting pipe extending into the preheating station, the convection-air blasting pipe having a blast orifice, the blast orifice opening below a path of travel of a glass sheet in the preheating station;

means for providing air to the convection-air blasting pipe so that air is discharged from the blast orifice, the blast orifice directing discharged air on an area of a glass sheet disposed in the preheating station for intensifying convection heat on the glass sheet such that a temperature difference between an upper surface of the glass sheet and a lower surface of the glass sheet is reduced;

means for measuring a temperature of a glass sheet in the bending station; and means for adjusting a distribution of radiation heat from the heating element field in the bending station by selectively turning on and off individual ones of the upper heating elements during bending of the glass sheet in response to a temperature measurement by the measuring means.

23. A bending furnace as set forth in claim 22, wherein air discharged from the blast orifice is drawn from outside of the furnace through the convection-air blasting pipe and is colder than air in the preheating station.

24. A bending furnace for glass sheets, comprising:
one or more heating stations including at least one preheating station;

a bending station, the bending station including a heating element field including a plurality of upper heating elements on a top of the bending station, the heating element field covering a glass sheet disposed in the bending station;

one or more cooling stations below the heating stations;

means for carrying a glass sheet from one station to another;

a convection-air blasting pipe extending into the preheating station, the convection-air blasting pipe having a blast orifice, the blast orifice opening below a path of travel of a glass sheet in the preheating station;

means for providing air to the convection-air blasting pipe so that air is discharged from the blast orifice, the blast orifice directing discharged air on an area of a glass sheet disposed in the preheating station for intensifying convection heat on the glass sheet such that a temperature difference between an upper surface of the glass sheet and a lower surface of the glass sheet is reduced;

means for measuring a temperature of a glass sheet in the bending station; and means for adjusting a distribution of radiation heat from the heating element field in the bending station by selectively turning on and off individual ones of the upper heating elements during bending of the glass sheet in response to a temperature measurement by the measuring means, wherein the bending station includes side and top walls, and side heating elements on the walls of the bending station below a level of edges of a glass sheet in the bending station, and a length of the upper heating elements above a middle section of a glass sheet in the bending station is limited in a height direction of the glass sheet such that a relation between the glass sheet height and the length of the upper heating elements is greater than 2.2.

25. A bending furnace as claimed in claim 24, wherein the relation between the glass sheet height and the length of the upper heating elements is greater than 2.4.

26. A method for bending glass sheets comprising the steps of:

transferring a glass sheet to one or more preheating sections of a furnace along a first horizontal track;

preheating the glass sheet by radiation from above and forced convection from below in the preheating sections, the forced convection heating a lower surface of the glass sheet being heated by blowing air through a convection air blasting pipe against the lower surface of the glass sheet;

intensifying the forced convection such that a temperature difference between an upper surface of the glass sheet and the lower surface is reduced;

transferring the preheated glass sheet to a bending section of the furnace, the bending section including a heating element field including a plurality of top radiation heating elements above the glass sheet, the bending section further including side heating elements disposed below a level of an edge of the glass sheet;

heating the glass sheet in the bending section by radiation heat from the top and side heating elements so that the glass sheet is bent; and lowering the glass sheet from the first track to a second horizontal track after the glass sheet is bent in the bending section.

* * * * *